United States Patent
Izadpanah

(10) Patent No.: US 6,791,734 B2
(45) Date of Patent: Sep. 14, 2004

(54) METHOD AND APPARATUS FOR INFORMATION MODULATION FOR IMPULSE RADIOS

(75) Inventor: Hossein Izadpanah, Newburry Park, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 10/293,211

(22) Filed: Nov. 12, 2002

(65) Prior Publication Data

US 2003/0202801 A1 Oct. 30, 2003

Related U.S. Application Data

(60) Provisional application No. 60/375,569, filed on Apr. 24, 2002.

(51) Int. Cl.[7] .............................. G02F 1/03; G02F 1/01; H04L 27/20; G01S 13/00; H03F 3/26
(52) U.S. Cl. ..................... 359/245; 359/264; 359/279; 359/307; 375/295; 375/130; 342/21; 342/22; 342/118; 342/135; 330/276; 398/186; 398/188; 398/189; 398/200
(58) Field of Search ................................ 359/245, 264, 359/279, 307; 375/295, 130; 398/186, 188, 189, 200; 342/21, 22, 118, 135, 179; 330/276, 301

(56) References Cited

U.S. PATENT DOCUMENTS

| | | | | |
|---|---|---|---|---|
| 5,311,351 A | * | 5/1994 | Chesnoy | 359/264 |
| 6,002,707 A | * | 12/1999 | Thue | 375/130 |
| 6,026,125 A | * | 2/2000 | Larrick et al. | 375/295 |
| 6,239,741 B1 | * | 5/2001 | Fontana et al. | 342/135 |
| 6,586,999 B2 | * | 7/2003 | Richley | 330/276 |

* cited by examiner

*Primary Examiner*—Loha Ben

(74) *Attorney, Agent, or Firm*—Tope-McKay & Associates

(57) ABSTRACT

A method and apparatus for information modulation for impulse radios are presented in both single-tone and pulse stream configurations. The modulation techniques include combinations of amplitude and phase modulation. The modulation techniques include both digital and analog schemes, including baseband on/off keying modulation, wavelet on/off keying modulation, pulse-position modulation, and FM modulation. Techniques for varying the modulation rate are also provided. Additionally, harmonics impulse ratio configurations are presented to take advantage of the modulation techniques.

57 Claims, 15 Drawing Sheets

$f_{VCO,1}$ $f_{VCO,2} < f_{VCO,1}$

METHOD AND APPARATUS FOR INFORMATION MODULATION FOR IMPULSE RADIOS

PRIORITY CLAIM

The present invention claims priority to provisional application 60/375,569, titled "Opto-Electronic UWB Radio Waveform Generator and Transmitter", filed with the U.S. Patent and Trademark Office on Apr. 24, 2002.

BACKGROUND (1) Technical Field

The present invention relates to field of optical and radio communications. More specifically, the present invention relates to a mechanism for generating modulated waveforms by combining a plurality of harmonics belonging to an impulse signal.

(2) Discussion

Radio transmissions are currently used to send signals, i.e. waveforms, over the air for receipt by receivers. One of the chief difficulties suffered by radio systems is providing a faithful reproduction of the transmitted signal. Current radios suffer from inadequate ability to reproduce incoming waveforms, particularly complex waveforms, and from limited bandwidths.

It is therefore desirable to provide a radio signal generation and transmission mechanism that can faithfully reproduce a modulated waveform and that is capable of utilizing a wide bandwidth.

SUMMARY

The present invention provides an opto-electronic modulation apparatus for a UWB radio system. The opto-electronic modulation apparatus comprises an optical modulator block for receiving a UWB harmonic impulse signal and for modulating the UWB harmonic impulse signal based on data received through an input to the modulator block in order to generate a modulated UWB signal for launching by a UWB transmitting block.

In another aspect, the modulation apparatus is configured to receive a UWB harmonic impulse signal in a form of a pulse stream of components, and to modulate each of the pulse stream components, except a beating component, based on data received through the input to the modulator block.

In still another aspect, the means for opto-electronically modulating a signal is a digital optical modulator.

In yet another aspect, the modulator block comprises an electro-optical intensity modulator.

In addition, the modulator block may be selected from a group consisting of electro-absorption modulators and LiNbO3 modulators and provides for on/off keying.

In a further embodiment, the modulation block has a modulation rate, and wherein the modulation rate is variable.

In a still further embodiment, the opto-electronic modulation apparatus further comprises a means for adjusting a pulse repetition frequency of an optical comb generator that supplies the pulse stream to the opto-electronic modulation apparatus.

Further, the modulation rate is variable by means of harmonic selection.

In a further embodiment, the opto-electronic modulation apparatus further comprises a voltage-controlled oscillator connected with the modulator block and with an optical comb generator that supplies the pulse stream to the modulation apparatus to allow for a continuous modulation rate change around a comb fundamental frequency.

In yet another embodiment, the pulse stream modulation block comprises an electro-optical phase modulator configured to impose a polarity modulation scheme onto the UWB harmonic impulse signal based on the data input. In this case, the electro-optical phase modulator can be configured to modulate the pulse stream components using a 180 degree phase shift to provide a bipolar phase shift-keying modulation scheme.

The modulation apparatus can also be configured to receive a single reference tone from a UWB harmonic impulse signal comprised of component tones, and to modulate a single reference tone of the component tones based on data received through the input to the modulator block to generate a beating note for beating with other component tones of the UWB harmonic impulse signal for generating difference notes for launching by a UWB transmitting block.

In another aspect, the means for opto-electronically modulating a signal is a digital optical modulator.

The modulator block can also be configured as an electro-optical intensity modulator that modulates the single reference tone by on/off keying.

In another aspect, the means for opto-electronically modulating a signal is an analog optical modulator.

In still another aspect, the optical modulator block comprises an acousto-optic modulator for receiving analog data and for providing an output signal based on the received analog data; a tapered waveguide Fiber Bragg Grating (FBG) having a reflective length, the waveguide FBG connected with the acousto-optic modulator and responsive to the output of the acousto-optic modulator such that the reflective length of the tapered waveguide array varies in response to signals from the acousto-optic modulator; and a circulator connected to receive the single reference tone and to pass the single reference tone to the tapered wave guide array to be modulated thereby according to changes in the reflective length, and then to a UWB transmitting block as a beating note; whereby an analog pulse-position modulation scheme is used to generate a modulated UWB signal for launching by a UWB transmitting block.

The modulator apparatus may further comprise an FM modulator for receiving and FM-modulating analog data, and for providing the modulated analog data to the modulator block through the input; whereby the FM modulator is used to drive the modulator block to cause the modulator block to impose FM-modulated data onto the single reference tone.

Further, the means for opto-electronically modulating a signal comprises a means for receiving a UWB harmonic impulse signal and for modulating the UWB harmonic impulse signal based on data in order to generate a modulated UWB signal for launching by a UWB transmitting block.

In a further aspect, the means for opto-electronically modulating a signal is configured to receive a UWB harmonic impulse signal in a form of a pulse stream of components, and to modulate each of the pulse stream components, except a beating component, based on data received through the input to the modulator block.

In yet another aspect, the means for opto-electronically modulating a signal further comprises a means for adjusting a pulse repetition frequency of an optical comb generator that supplies the pulse stream to the means for opto-electronically modulating a signal.

BRIEF DESCRIPTION OF THE DRAWINGS

The objects, features and advantages of the present invention will be apparent from the following detailed descriptions of the various aspects of the invention in conjunction with reference to the following drawings.

DETAILED DESCRIPTION

Figure 1A:
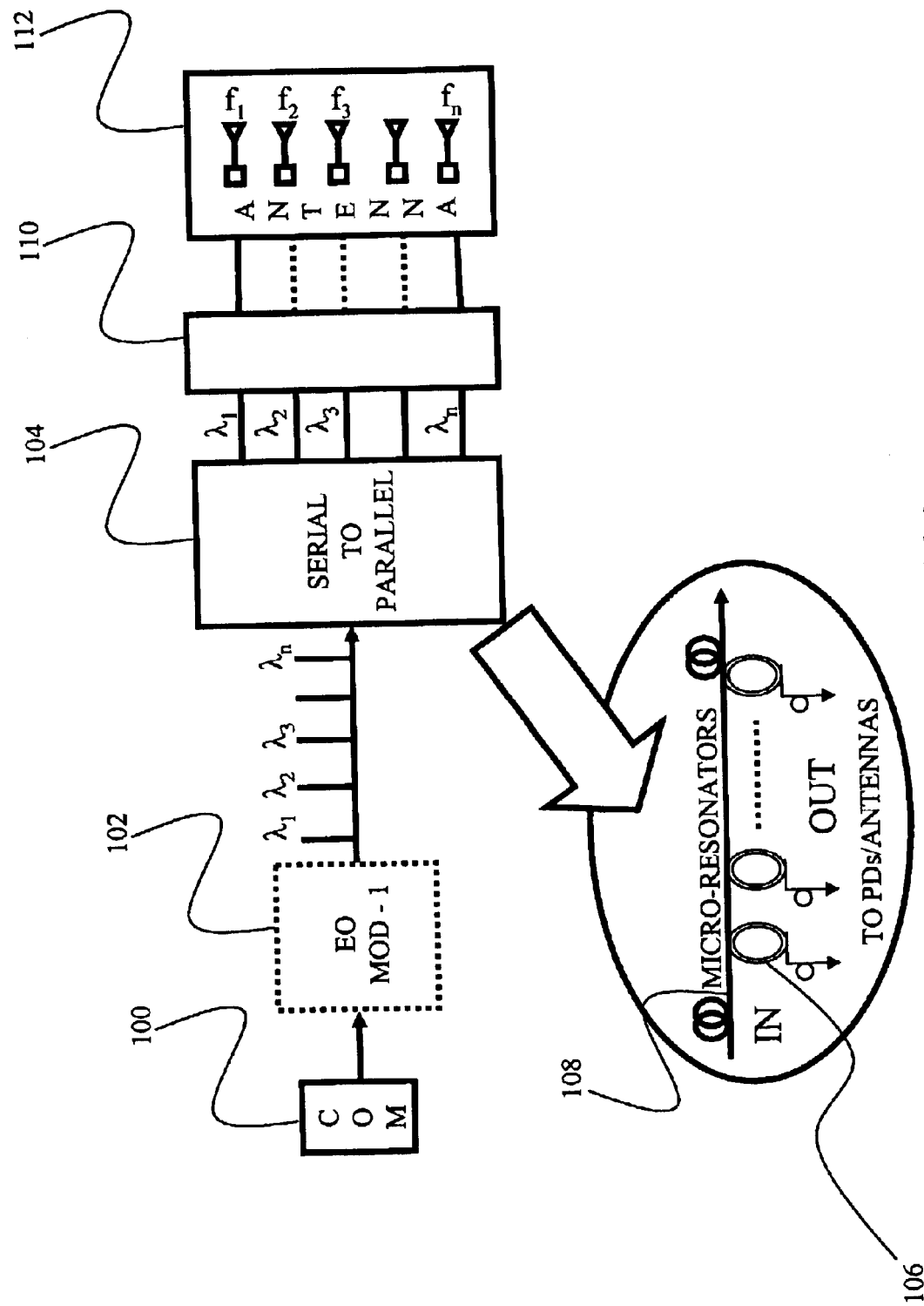
FIG. 1(a) is a block diagram of a harmonic impulse radio (HIR) with a comb modulation block incorporated therein.

The present invention relates to field of optical and radio communications. More specifically, the present invention relates to a mechanism for generating arbitrary waveforms by combining a plurality of impulse signal components. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical aspects of the present invention is provided. Finally, a discussion is provided to give an understanding of the specific details.

(1) Glossary

Before describing the specific details of the present invention, a centralized location is provided in which various terms used herein and in the claims are defined. The glossary provided is intended to provide the reader with a feel for the intended meaning of the terms, but is not intended to convey the entire scope of each term. Rather, the glossary is intended to supplement the rest of the specification in more accurately explaining the terms used.

Beating—The combining of two or more frequencies to produce sum and difference frequencies (called beats). In the case of the present invention, the difference frequencies are intended to provide lower frequencies than those used in the optical components in order to prepare for launching into free space by an antenna.

Note—The term "note", as used herein is intended to refer to harmonics $\lambda_1, \lambda_2, \ldots, \lambda$ of a base or beating wavelength $\lambda_0$, which are "beat" together to form a difference therebetween at a lower frequency in preparation for launching into free space by an antenna. Observe that although the base wavelength used throughout this discussion is $\lambda_0$, any of the tones $\lambda_0, \lambda_1, \lambda_2, \ldots, \lambda_n$ may be used as the base wavelength to the same effect.

Tone—The term "tone", as used herein is intended to refer to optical wavelengths generated by a comb generator as well as their electrical signal counterparts generated from the optical wavelengths by optical-to-electrical converters such as photodiodes. Tones are represented as $\lambda_0, \lambda_1, \lambda_2, \ldots, \lambda_n$, where, generally, $\lambda_0$ is a base wavelength and $\lambda_1, \lambda_2, \ldots, \lambda_n$ are the harmonics of the base wavelength.

(2) Discussion (a) The Harmonic Impulse Radio (HIR) System

The present invention provides methods and apparatus for imposing information modulation on signals for carrier-free opto-electronic (OE) ultra-wideband (UWB) radios. In UWB radios, system impulse generation and processing is performed in the optical domain, fundamentally providing many advantages as well as providing additional radar/radio functionality not possible with conventional (pure) electronic systems. OE-UWB impulse radios provide a user with the ability to tune the radio reach, resolution, and beam direction through programmable impulse width, shape, and repetition rate. Important aspects of such radios, besides having the ability to generate very short pulses, are flexibility and having dynamically alterable operating frequencies, flexible modulation format, and variable data rates. These capabilities can be implemented in the radio OE layer with advantages beyond those of electrical counterparts such as higher speed and greater dynamic range. The OE-UWB system discussed herein is termed a harmonics impulse radio (HIR). A variety of techniques for imposing information on impulse streams for data modulation are presented herein. The techniques are based on the amplitude or phase modulation of the HIR collective or individual harmonic signal components in the OE processing layer, behind the antenna arrays.

Figure 1B:
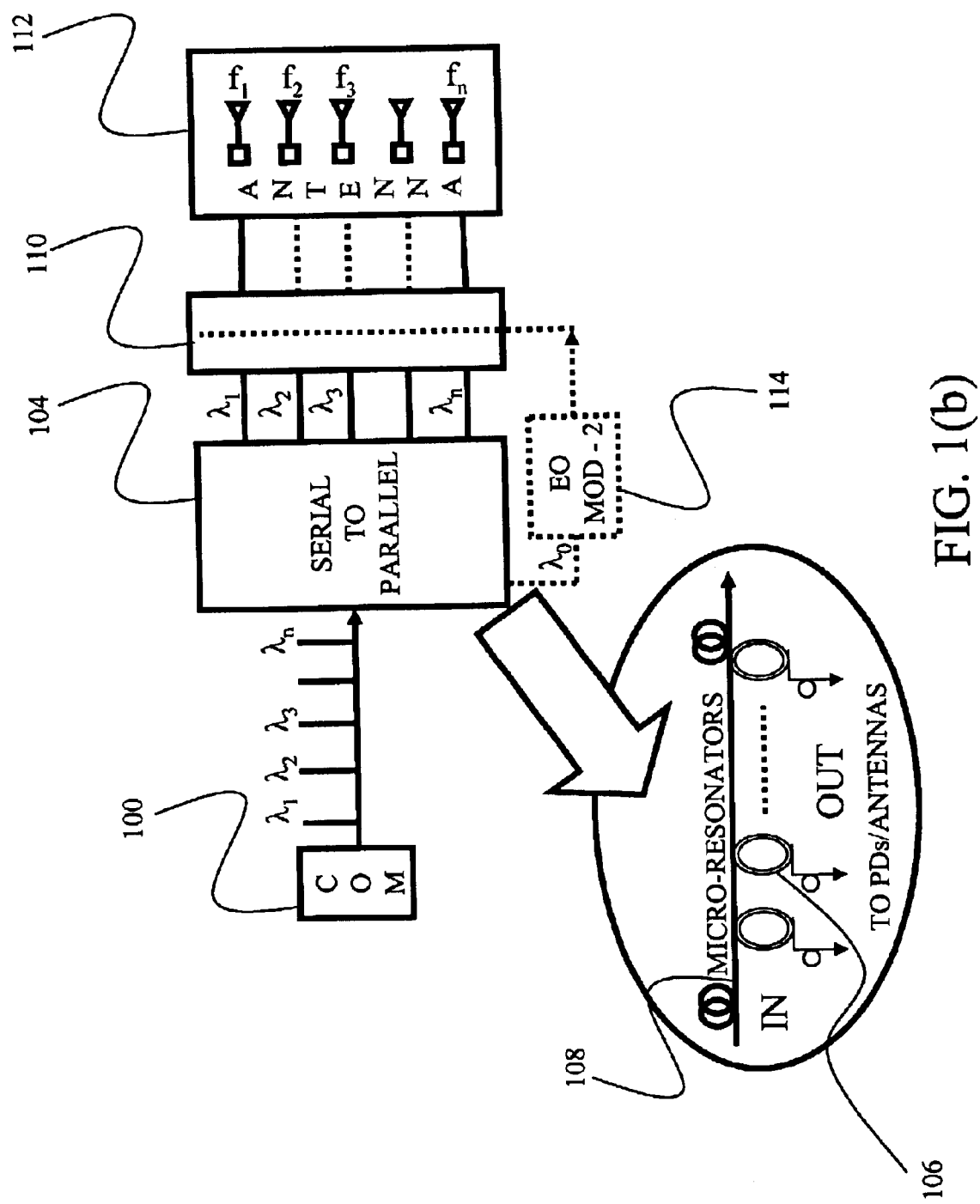
FIG. 1(b) is a block diagram of a HIR with a single-tone modulation block incorporated therein.

A block diagrams of two configurations for an OE-UWB HIR for use with the modulation schemes presented herein are shown in FIG. 1(a) and FIG. 1(b). The HIR waveform generator combines photonic multi-wavelength comb generation, high resolution and compact optical demultiplexing, and optical heterodyne high-frequency signal generation to deliver an ultra-wide frequency spectrum, and may be incorporated with a low-profile printed circuit antenna array for impulse radiation.

In both figures, in the system, an optical comb generator 100 generates a serial plurality of coherent optical wavelengths (serial optical tones) in a single stream at a desired wavelength spacing (inter-modial). A variety of devices may be selected for the optical comb generator 100, non-limiting examples including a mode-locked laser (MLL) or a phase-locked multi-tone photonic oscillator. For simplicity, the tones are optical wavelengths, represented as $\lambda_0, \lambda_1, \lambda_2, \ldots, \lambda_n$, where $\lambda_0$ is a base wavelength (tone) and $\lambda_1, \lambda_2, \ldots, \lambda_n$ are the harmonics of the base wavelength.

Depending on the modulation scheme used, the plurality of serial tones, $\lambda_0, \lambda_1, \lambda_2, \ldots, \lambda_n$, are either provided to an electro-optical modulator block 102 for modulation, as shown in FIG. 1(a), or to a serial-to-parallel converter (i.e., a wavelength demultiplexer) 104, as shown in FIG. 1(b) to produce a plurality of parallel tones $\lambda_0, \lambda_1, \lambda_2, \ldots, \lambda n$. Non-limiting examples of serial-to-parallel converters that may be used for this purpose include optical gratings, array waveguide gratings (AWGs), and optical filters. Alternately, an array of laser diodes can be used instead of the grating, with each laser diode in the array being optically locked to an individual one of the serial optical tones generated by the optical comb generator 100.

In the case, shown in FIG. 1(a), where the collective serial tones are provided to an electro-optical modulator block 102 for modulation, the modulator is capable of altering the amplitude (on or off) and/or phase of each so that each harmonic becomes an individual component of a waveform to be later combined. After modulation, the individual components are passed to the serial-to-parallel converter 104.

The serial-to-parallel converter 104 may be in the form of a plurality of extremely high Q micro-resonators 106 (with Q-values in the neighborhood of 5000 and up), which are typically disc or sphere-shaped filters coupled along a fiber-optic cable 108, with each micro-resonator 106 filtering only the wavelength component for which it was designed (e.g., the dimension of each the micro-resonator 106 is selected to be resonant at the particular wavelength it is intended to filter). Because the micro-resonators are selected with an extremely high Q, the comb generator line spacing can be as close as a few MHz.

After serial-to-parallel conversion, the parallel components are output to a plurality of photodetectors (photodiodes) 110. The photodetectors 110 convert the optical components (optical notes) to corresponding electrical tones, each of which is transmitted from a corresponding antenna in an array of antennas 112.

An alternate UWB modulation configuration is shown in FIG. (b), where the output of the optical comb generator 100 is passed directly to the serial-to-parallel converter 104. An electro-optical modulator block 114 is connected to receive a base wavelength $\lambda_0$ for modulation. The modulated base wavelength $\lambda_0$ is then provided to each of the photodetectors 110 for beating with the other incoming harmonic components to create a plurality of modulated signal components prior to launching the signal components via the antennas 112. Note that although use of the wavelength $\lambda_0$ as the base wavelength (tone) is advantageous, any of the harmonics or the base wavelength may be used as the reference carrier. The photodetectors 110 convert the beat optical components (optical notes) to corresponding electrical tones, each of which is transmitted from an antenna in an array of antennas 112. Each of the parallel electrical tones may, for example, be a radio-frequency (RF) tone that is in resonance with its corresponding antenna in the array of antennas 112. Since the optical tones are each phase-locked to each other as well as to the reference optical carrier (the base wavelength $\lambda_0$), the generated RF tones are also phase-locked to each other and have very good spectral purity and low phase noise characteristics.

In general, each opto-electronic converter (i.e., the photodetectors 110) performs two functions: (i) beating two incident optical components to generate a difference note and (ii) converting photonic energy to electronic energy, which is injected into a corresponding antenna element for each radiating frequency component. The photodiodes 110, for example, may comprise an array of PIN or uni-traveling photodetectors with each photodiode 110 connected with an antenna element of an array of antennas 112 fabricated on a hybrid PCB board. Each element of the array of photodiodes 110 can, for example, be a tuned transceiver, optimized for narrow-band processing or operation at a single RF frequency. The array of antennas 112 will be discussed further below.

For purposes of this discussion the configuration shown in FIG. 1(a) is referred to as pulse stream modulation, and the configuration shown in FIG. 1(b) is referred to as single-tone modulation.

Next, various modulation schemes will be described in the context of the HIR system just discussed. In the figures accompanying each of the modulation schemes, modifications to the HIR are provided to show the relationship of the modulator to the other components of the system. Note that although the modulation techniques are each presented with regard to one or the other of the pulse stream modulation and single-tone modulation configurations, it should be recognized that they can generally be applied in either scheme with minor modification. Thus, either modulation blocks 102 and 114 can be viewed as incorporating one of the modulation techniques described below.

(b) Modulation Techniques

In this section, various modulation schemes are presented in the context of the HIR system just described. The discussion of the modulation schemes is accompanied by figures that depict any modifications necessary to the radio system (e.g., the placement of the modulator with respect to other components).

(i) Digital Baseband on/off Keying (OOK) Modulation

Figures 2A, 2B:
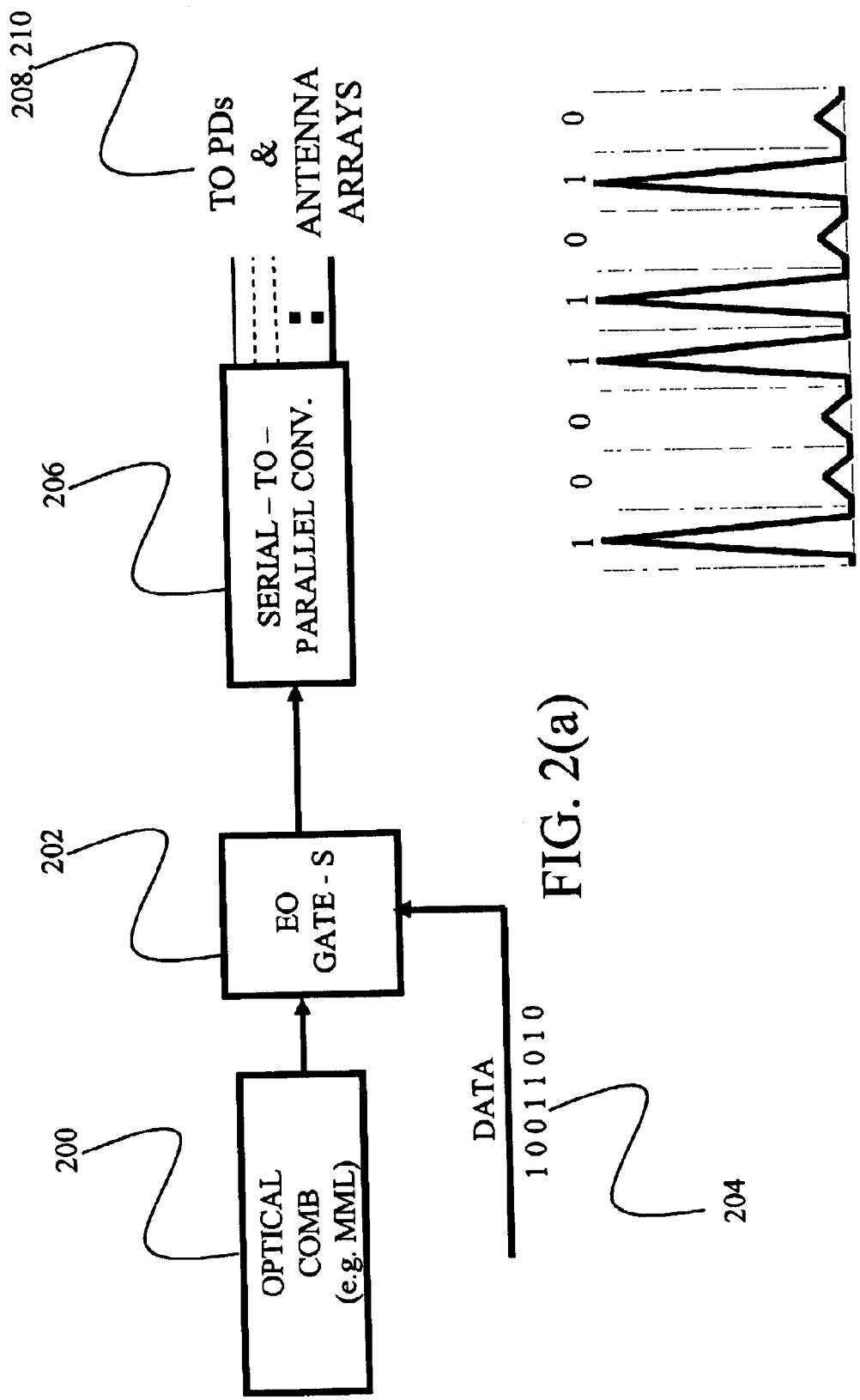
FIG. 2(a) is a block diagram of HIR components configured for digital baseband on/off modulation.
FIG. 2(b) is an illustration of pulses representing the output of the modulator in the block diagram of FIG. 2(a)

A block diagram is presented in FIG. 2(a), showing an adaptation of the HIR components for digital baseband OOK modulation. As shown, the output of the optical comb generator 200 is directly connected with an electro-optical intensity modulator 202. Examples of electro-optical intensity modulators 202 include EAM (electro-absorption modulators), LiNbO3 modulators, and EO phase modulators. For purpose of example, a radio electrical pseudo-random (PN) data signal generator 204 drives the electro-optical intensity modulator 202, causing an OOK "gating" action to pass or eliminate individual so-called return-to-zero (RZ) pulses (representing data bits "1" or "0", respectively) from the output of the modulator 202. The pulses are depicted in FIG. 2(b).

After modulation, the components are passed to a serial-to-parallel converter 206 and then to a plurality of photodetectors 208 and an antenna array 210 as described in the description of the HIR system in section 2(a). To convert the optical separated tones into electrical tones in the photodiodes 208, the base wavelength $\lambda_0$ (e.g. the fundamental wavelength or one of the contributing harmonics) is selected to be used to beat with other wavelengths from the comb wavelengths to generate electrical notes.

(A) Single Tone on/off Keying

Figure 3A:
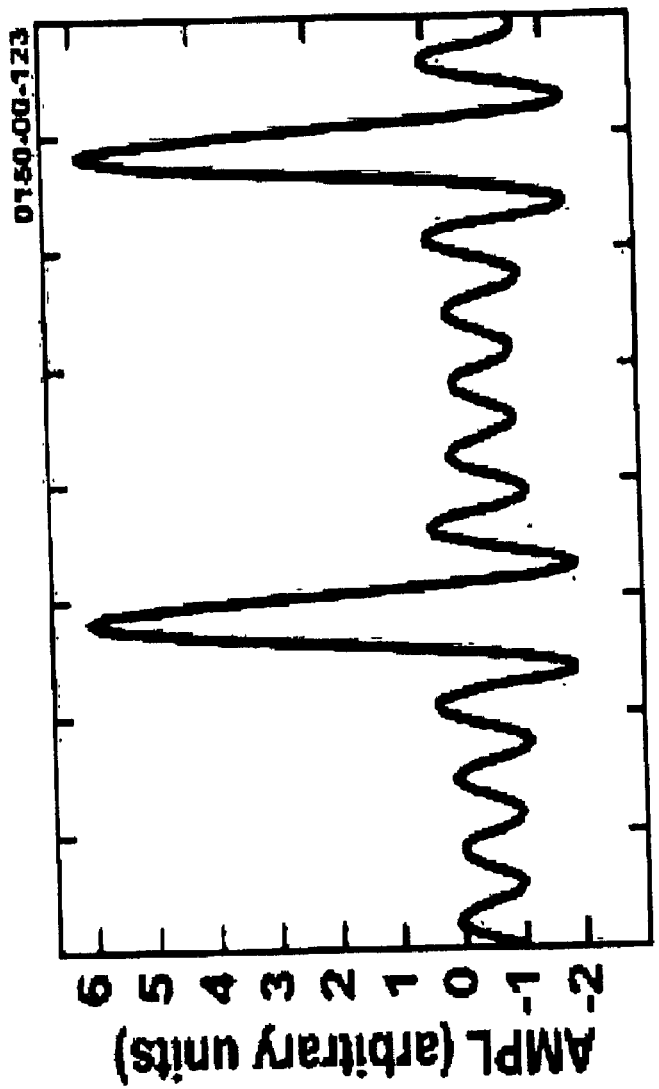
FIG. 3(a) is a graph of an example waveform outputted by an antenna array before single pulse on/off keying modulation.
Figure 3B:
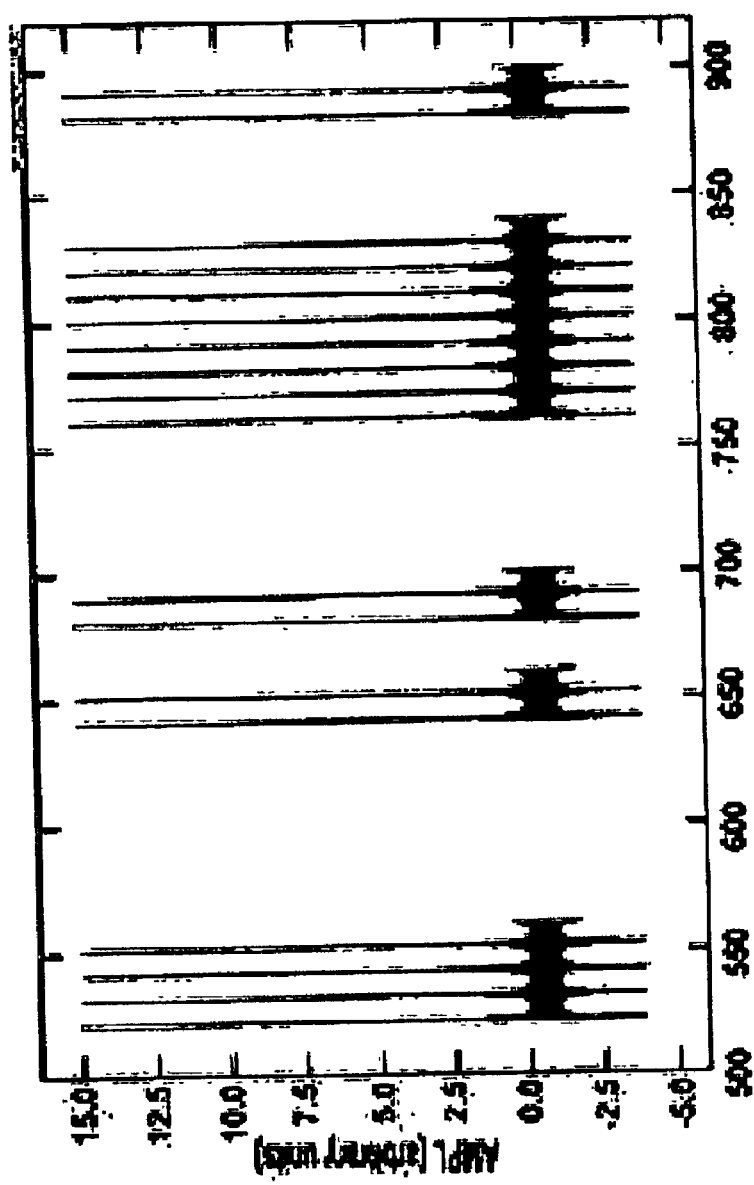
FIG. 3(b) is a graph showing the waveform exemplified in FIG. 3(a) after PN modulation.

In the digital baseband OOK modulation scheme, when the base wavelength $\lambda_0$ is selected to be the comb fundamental component, the modulation scheme is "single tone" baseband, generating pulses as shown in FIG. 2(b). A typical baseband OOK modulation for a single tone HIR system, as outputted via the antenna array 210, is shown in FIG. 3(a) before modulation and in FIG. 3(b) when modulated by a PN stream.

(B) Wavelet on/off Keying

Figure 4A:
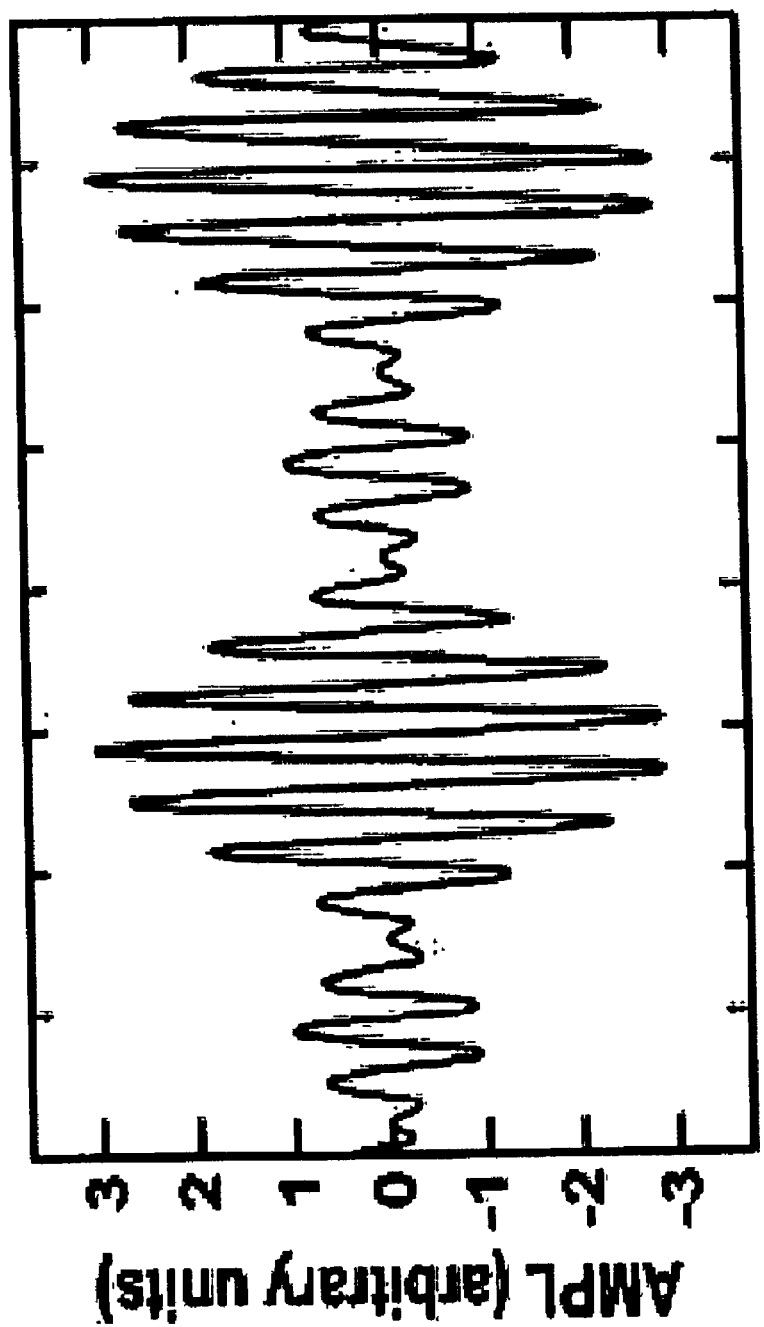
FIG. 4(a) is a graph of an example wavelet waveform outputted by an antenna array before wavelet on/off keying modulation before PN modulation.
Figure 4B:
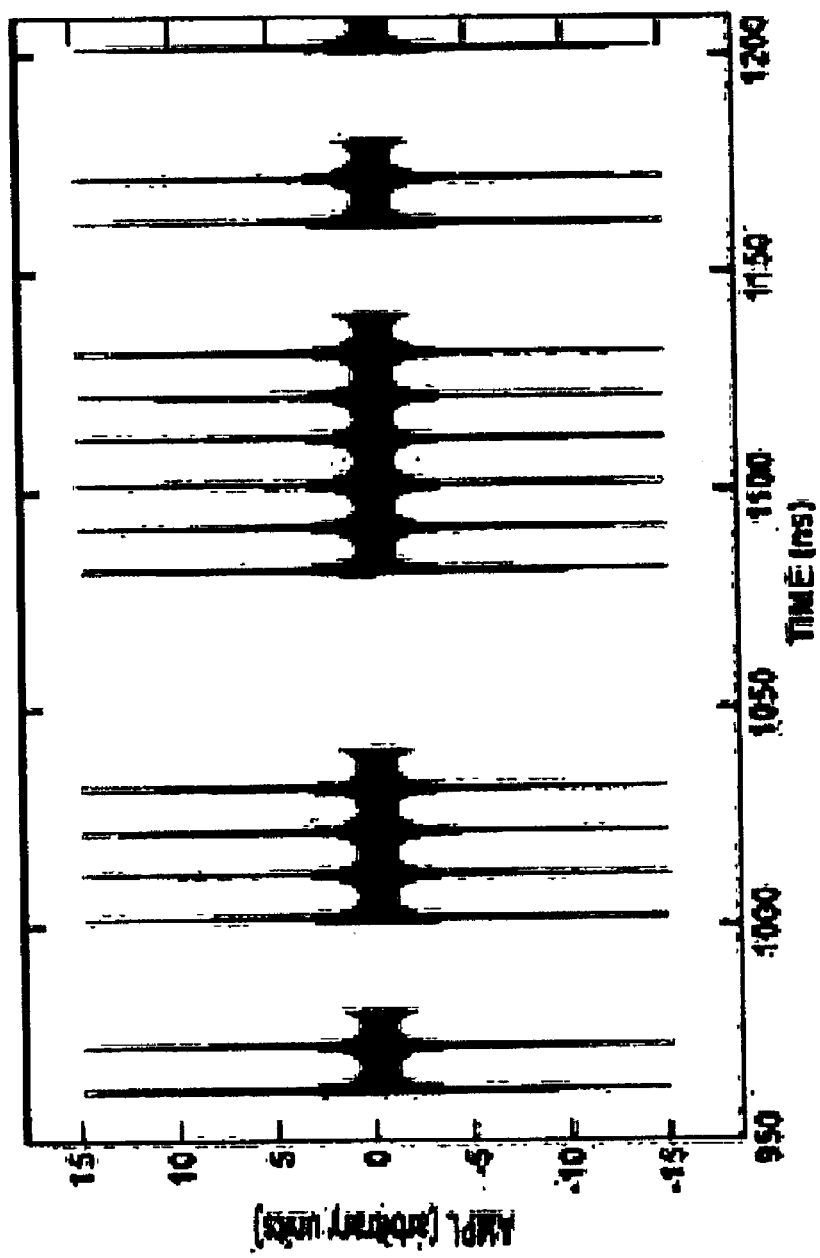
FIG. 4(b) is a graph showing the waveform exemplified in FIG. 4(a) after PN modulation.

The single tone OOK modulation scheme just described can also be applied for "wavelet" type short pulses, where the beating wavelength $\lambda_i$, is selected to be different from the fundamental harmonic component $\lambda_0$. In this case, the wavelet center frequency is determined by the wavelength $\lambda_1$, a harmonic, or a wavelength coherently shifted into the microwave or millimeter-wave band of frequencies. A typical wavelet waveform is shown in FIG. 4(a), along with its modulated counterpart in FIG. 4(b). Note that the waveforms shown in FIG. 3(a) and FIG. 3(b) used the fundamental harmonic component for $\lambda_0$, whereas the waveforms shown in FIG. 4(a) and FIG. 4(b) use the $4^{th}$ harmonic component. In both cases, the data rate is the same. The PN modulated wavelet signal has both positive and negative polarities, as expected.

(C) Variable HIR Rate Modulation Rates

Figure 5:
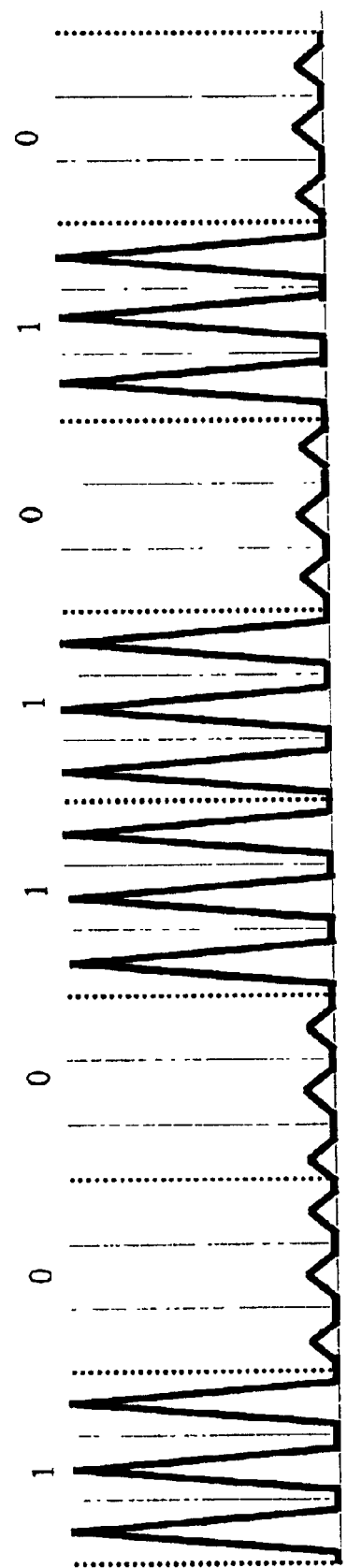
FIG. 5 is a graph depicting a series of pulses representing the same on/off pattern as shown in FIG. 2(b), where the effective pulse rate has been adjusted to a lower frequency by a factor of M=3.

The maximum modulation rate, for single pulse as well as for wavelet cases, is equal to the comb generator pulse repetition frequency (PRF) of the fundamental harmonics. However, the rate can be tuned and adjusted at a lower frequency by a factor of "M", an integer, causing the modulated stream to contain "M" pulses in each bit interval, as depicted in FIG. 5. This scheme increases the receiver sensitivity while integrating the received signal over a greater number of pulses.

(ii) Single-Tone Baseband Modulation

Figure 6:
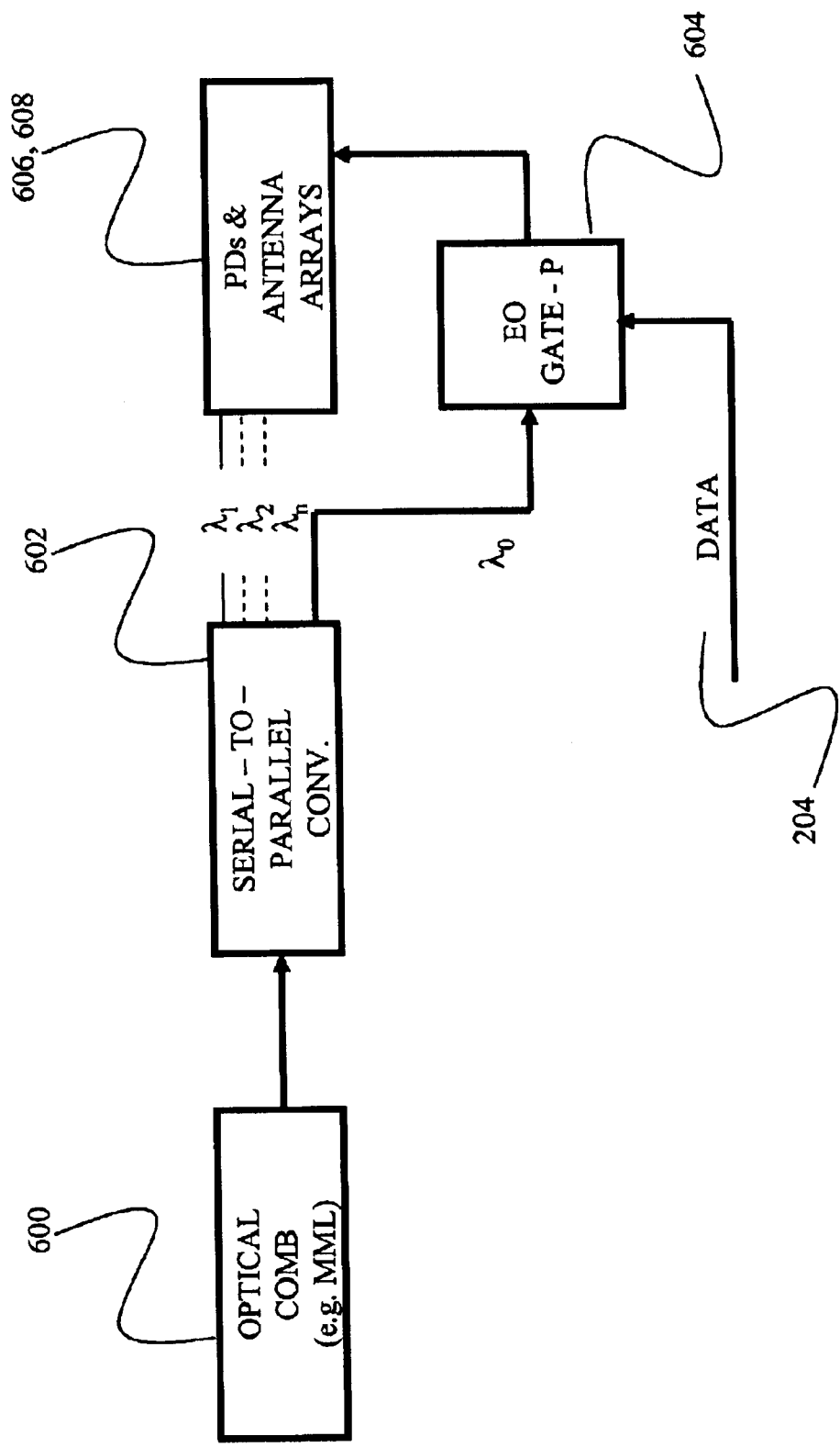
FIG. 6 is a block diagram of HIR components configured for single-tone baseband modulation.

The OOK modulation scheme could also be imposed on the HIR impulse stream by modulating the reference wavelength $\lambda_R$ used to beat each wavelength on the photodiodes. The configuration of this scheme is depicted in FIG. 6. The optical comb from a optical comb generator 600 is passed to a serial-to-parallel converter 602. After serial-to-parallel conversion, a reference wavelength $\lambda_R$ is modulated by the electro-optical modulator 604 using data from a data stream 204. As the reference wavelength is "gated" by the driving electrical data, which serves as the modulating signal, the signals from the photodetectors 606 are modulated in response to the presence or absence of energy in the reference wavelength $\lambda_R$ reaching the photodetectors 606. The discussion regarding maximum modulation rate, rate tuning, and increased rates presented herein in section 2(b)(i) apply here also.

An important flexibility afforded by this scheme is that the generated "Wavelet" center frequency may be shifted by the known "wavelength conversion" of the reference wavelength. The photodetector electrical signal frequency may, for example, be RF, examples of which include the microwave and millimeter-wave regions. The response bandwidth of the photodetectors 606 should be selected to generate signals in the desired bands.

Figure 7A:
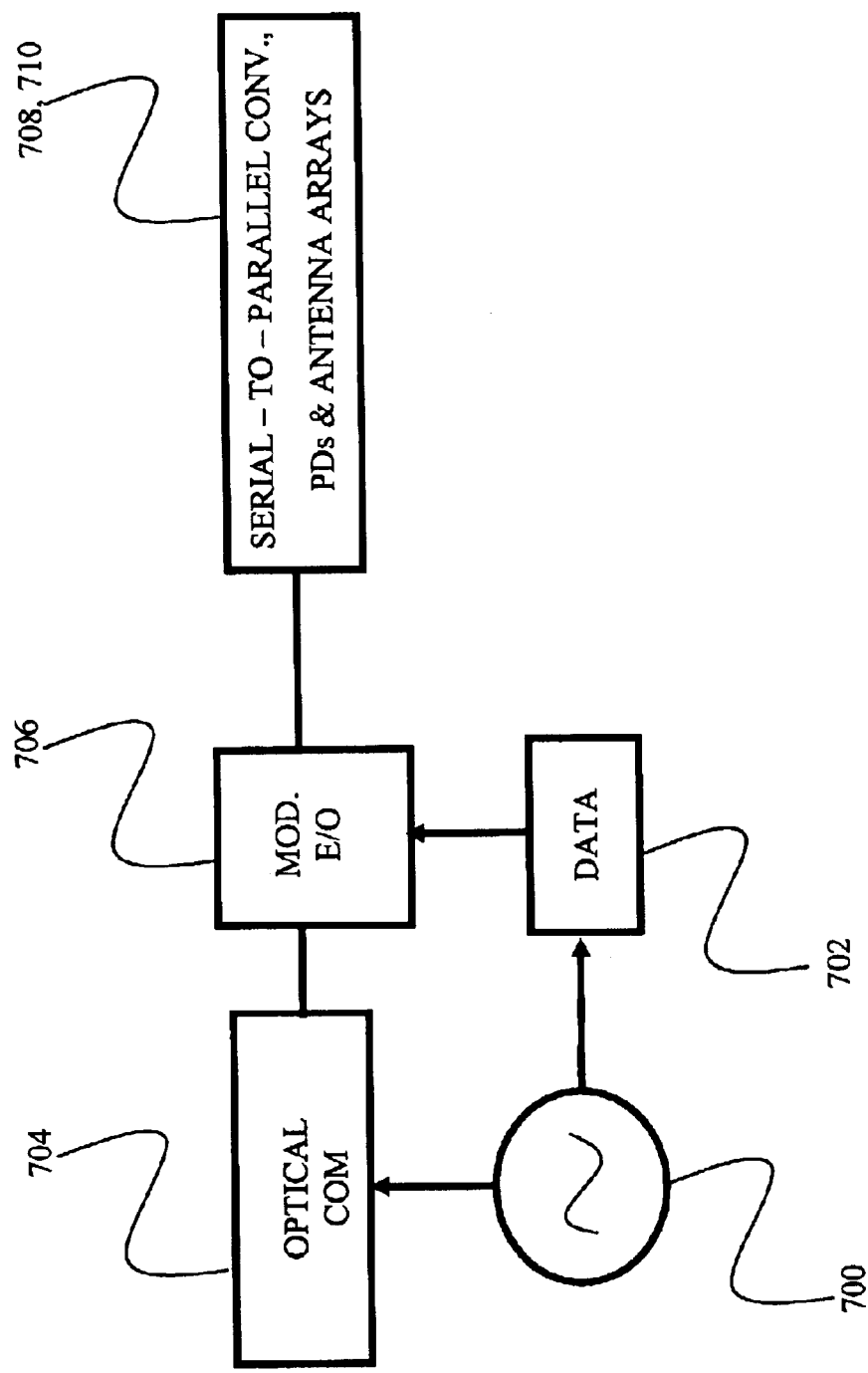
FIG. 7(a) is a block diagram of HIR components configured for variable-rate modulation using a voltage-controlled oscillator (VCO)
Figure 7B:
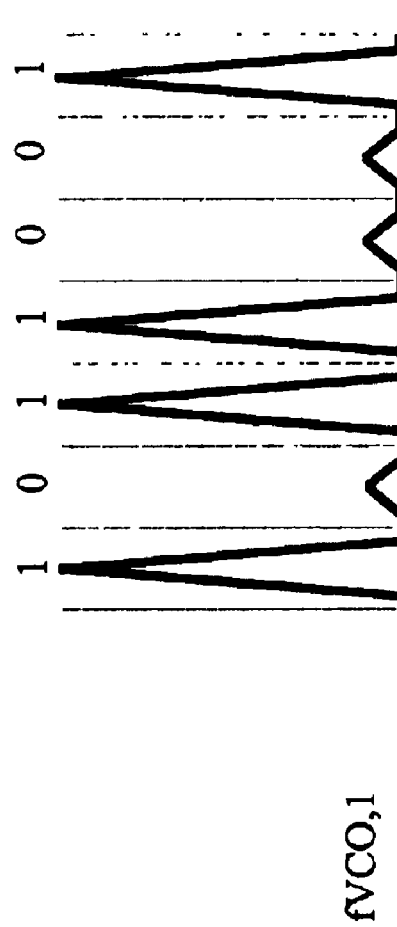
FIG. 7(b) is a graph depicting a waveform produced at a first VCO frequency.
Figure 7C:
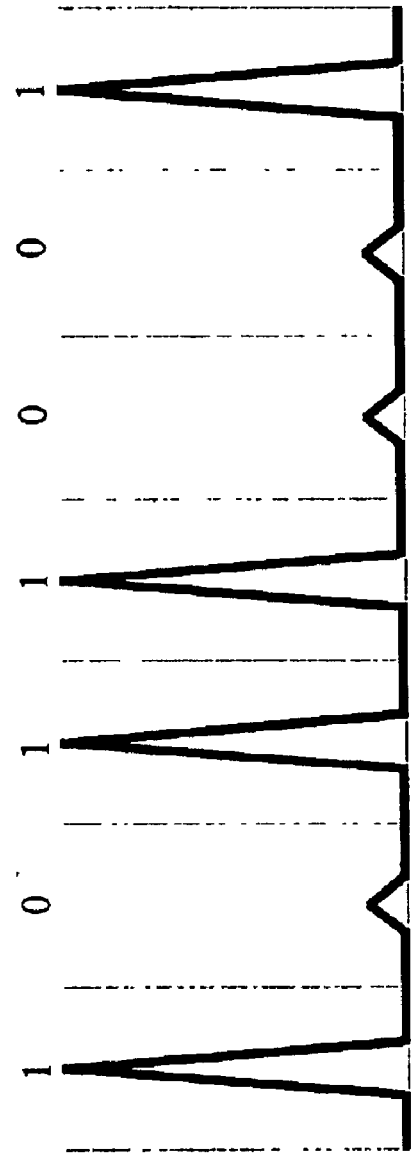
FIG. 7(c) is a graph depicting a waveform produced at a second VCO frequency, where the second VCO frequency is less than the first VCO frequency used for FIG. 7(b)

The data rate of this system can be increased continuously by increasing the comb generator PRF. For example, if the system uses an active MLL, it could be driven with a voltage-controlled oscillator (VCO) for data rate adjustment, the situation depicted in FIG. 7(a). In FIG. 7(a), a VCO 700 is connected with a data source 702 and with an optical comb generator 704 to control the rate of each. The optical comb from the VCO-controlled optical comb generator 704 and the data from the data source 702 (at a VCO-controlled data rate) are provided to a modulator block 706, where the data is modulated onto the optical comb prior to providing the modulated optical comb to the serial-to-parallel converter 708 and the antenna array 710 for launching into free-space as a UWB radio signal. For comparison, FIG. 7(b) and FIG. 7(c) show the results of data modulated with a first VCO frequency and a second VCO frequency, respectively, where the first VCO frequency is less than the second VCO frequency.

(iii) Bipolar Pulse Modulation

Figure 8A:
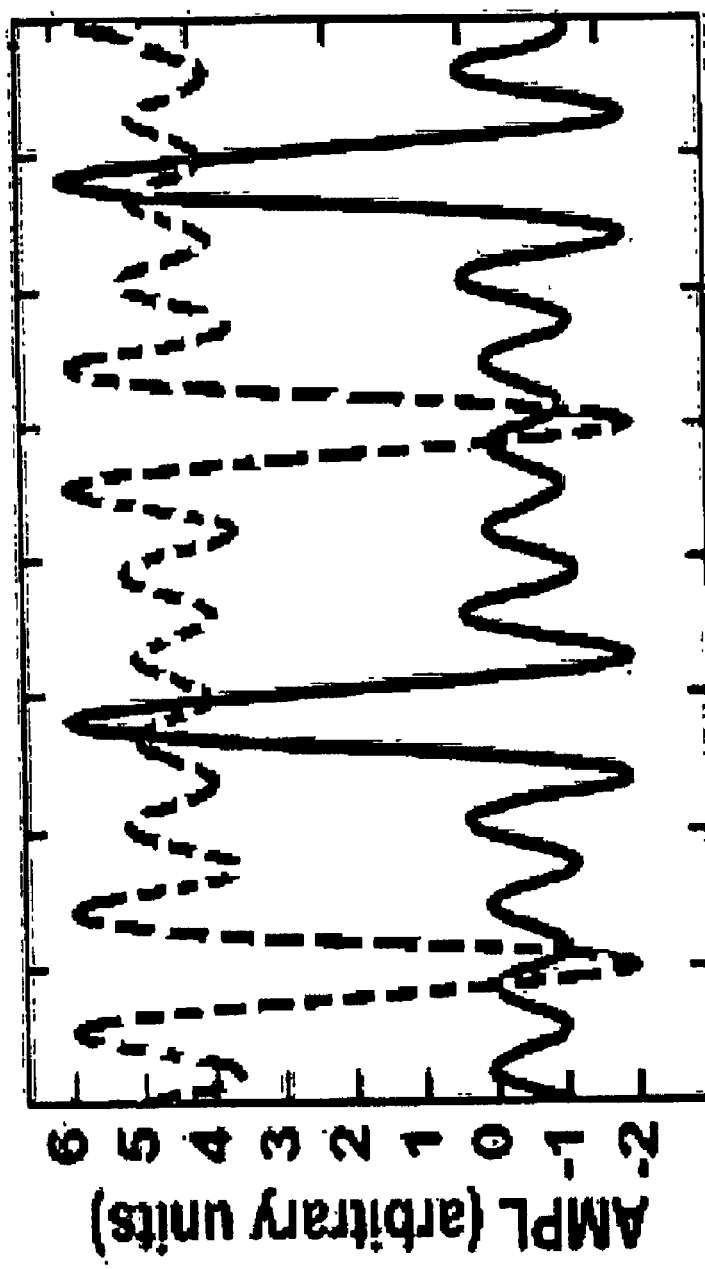
FIG. 8(a) is a graph of an example waveform outputted by an antenna array before on/off polarity keying modulation.
Figure 8B:
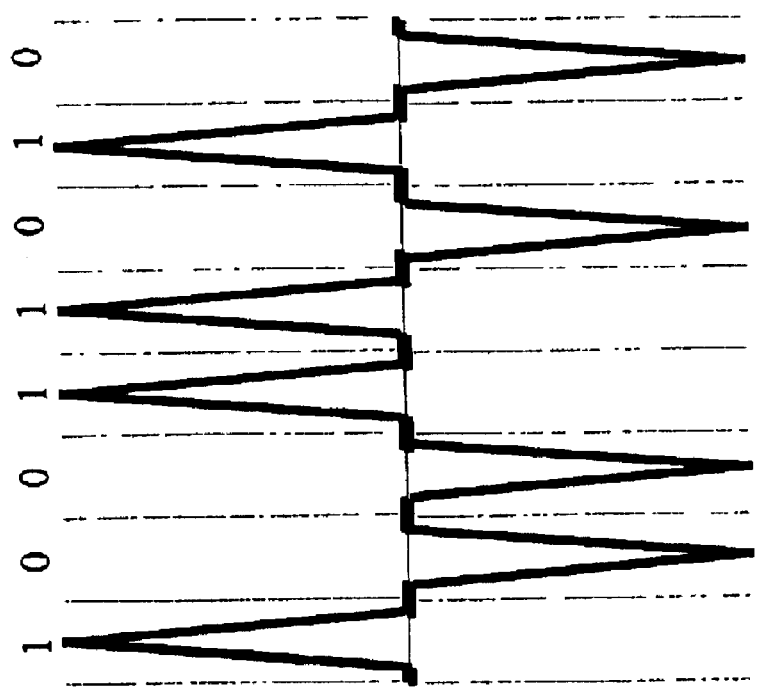
FIG. 8(b) is a graph showing the waveform exemplified in FIG. 8(a) after PN modulation.

The single-tone baseband modulation scheme could be modified to generate, for example, an impulse modulated radio signal in which the symbol "1" is represented by a positive pulse and the symbol "0" is represented by a negative pulse, as shown in FIG. 8(a) which represents emitted pulses prior to modulation and in FIG. 8(b), which represents emitted data pulses after polarity modulation. This modulation scheme can be achieved by replacing the electro-optical intensity modulator 202 in the scheme shown in FIG. 2 with an electro-optical phase modulator. In the case shown in FIG. 8(a) and FIG. 8(b), a 180 degree phase shift, binary phase shift keying (BPSK), is imposed on the reference wavelength by applying a two-level shifting voltage such as 0-volt and 1-volt or −1 volt and +1 volt combinations.

(iv) Variable-Rate Modulation Scheme

Two approaches are presented for varying the modulation rates. In the first, the rate is continuously variable (in a relatively small range) around the fundamental comb PRF. Here, a VCO can be used to drive the active optical comb (MLL) PRF in order to tune the PRF within the MLL fractional tuning range.

In the second scheme, the rate is step-tuned to lower rates at sub-harmonics of the comb PRF. In this case, step-tuning permits selection a sub-harmonic integer number of the fundamental frequency. Hence, at a 100 MHz fundamental frequency, the modulation rate could be set to 50, 25, 12.5 MHz, etc. An alternative step-tuning technique may be accomplished by selecting the fundamental frequency at multiples of the MLL cavity modes. Examples include: $f_1$, $f_2$, $f_3$, $f_4$, etc., or $f_2$, $f_4$, $f_6$, etc., or $f_3$, $f_6$, $f_9$, etc. The rates are then step-tuned to an increased frequency in steps of 2M (M=1, 2, 3, . . . ) within the gain profile of the MLL, which normally covers many hundreds of optical frequencies, i.e., many hundred lines at the harmonics of mode locked frequencies.

(v) Analog PPM Scheme

An important flexibility of the HIR system discussed in section 2(a) is that it can easily accommodate analog as well as digital modulation schemes based on its short impulse waveforms. The analog schemes may be described within the context of analog pulse position modulation (A-PPM) because the HIR operates using short impulse waveforms. Analog modulation bandwidth can easily be in the multi-GHz range, and is limited by the impulse width. Typical impulse intervals achievable by the HIR system are at least in the 200–1000 ps range. Thus, an A-PPM bandwidth of at least 1–5 GHz can be realized.

(A) Single-Tone Analog Pulse Position Modulation

Figure 9:
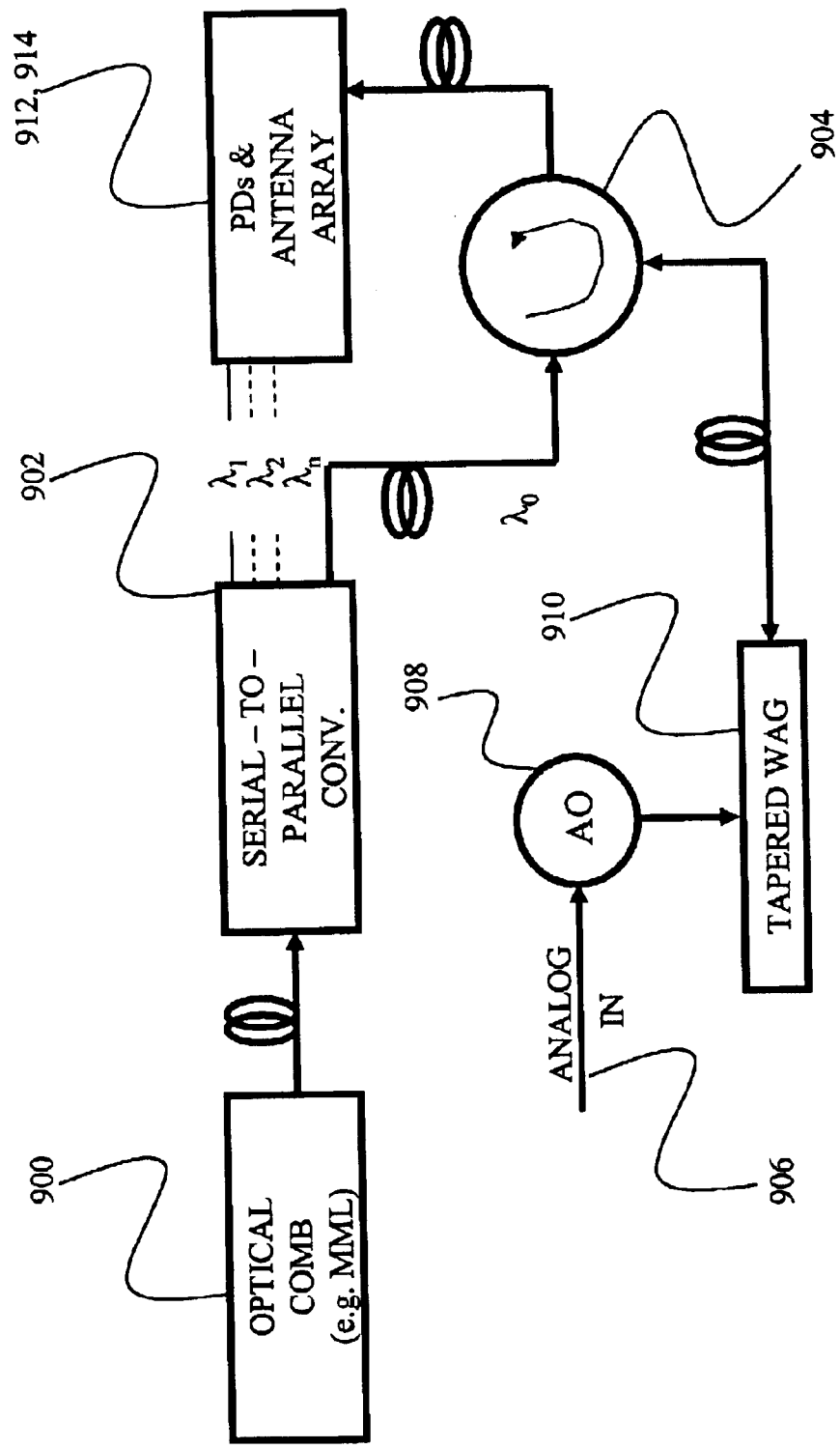
FIG. 9 is a block diagram of HIR components configured for A-PPM modulation using a tapered waveguide grating.

A block diagram of a system that imposes A-PPM on a HIR pulse stream is shown in FIG. 9. In this case, the common beating wavelength $\lambda_0$ is sent into a linearly chirped waveguide grating. The waveguide grading is driven by an acousto-optic (AO) modulator where the grading pitch that reflects the $\lambda_0$ is shifted up and down in response to the applied "analog" voltage. The analog voltage causes the $\lambda_0$ reflection point to be changed by introducing a corresponding delay in the $\lambda_0$ reflection. The varied delayed version of $\lambda_0$ used for beating to each harmonics' component will, when combined in the air, generate a pulse, the relative position of which is linearly modulated by the analog voltage. In FIG. 9, an optical comb generator 900 produces a serial optical comb, which is passed to a serial-to-parallel converter 902, where it is converted to a set of parallel optical components, one of which is passed to an optical circulator 904. Also, analog data from a data source 906 is provided to an acousto-optic (AO) modulator 908, which acts as a controller for a tapered waveguide array grating 910. The tapered waveguide grating 910 acts in response to the AO modulator 908, typically by varying its reflective length. Thus, the AO modulator 908 imposes a modulated signal onto the optical component through variations in the reflective length of the tapered waveguide array 910. The modulated component from the tapered waveguide array 910 is passed into the optical circulator 904, where it is subsequently passed to photodetectors 912, where it serves to impose the modulation from the AO modulator 908 onto the other components. The components are then launched into free-space by the antennas 914.

(B) Analog Modulation by FM Technique

Figure 10:
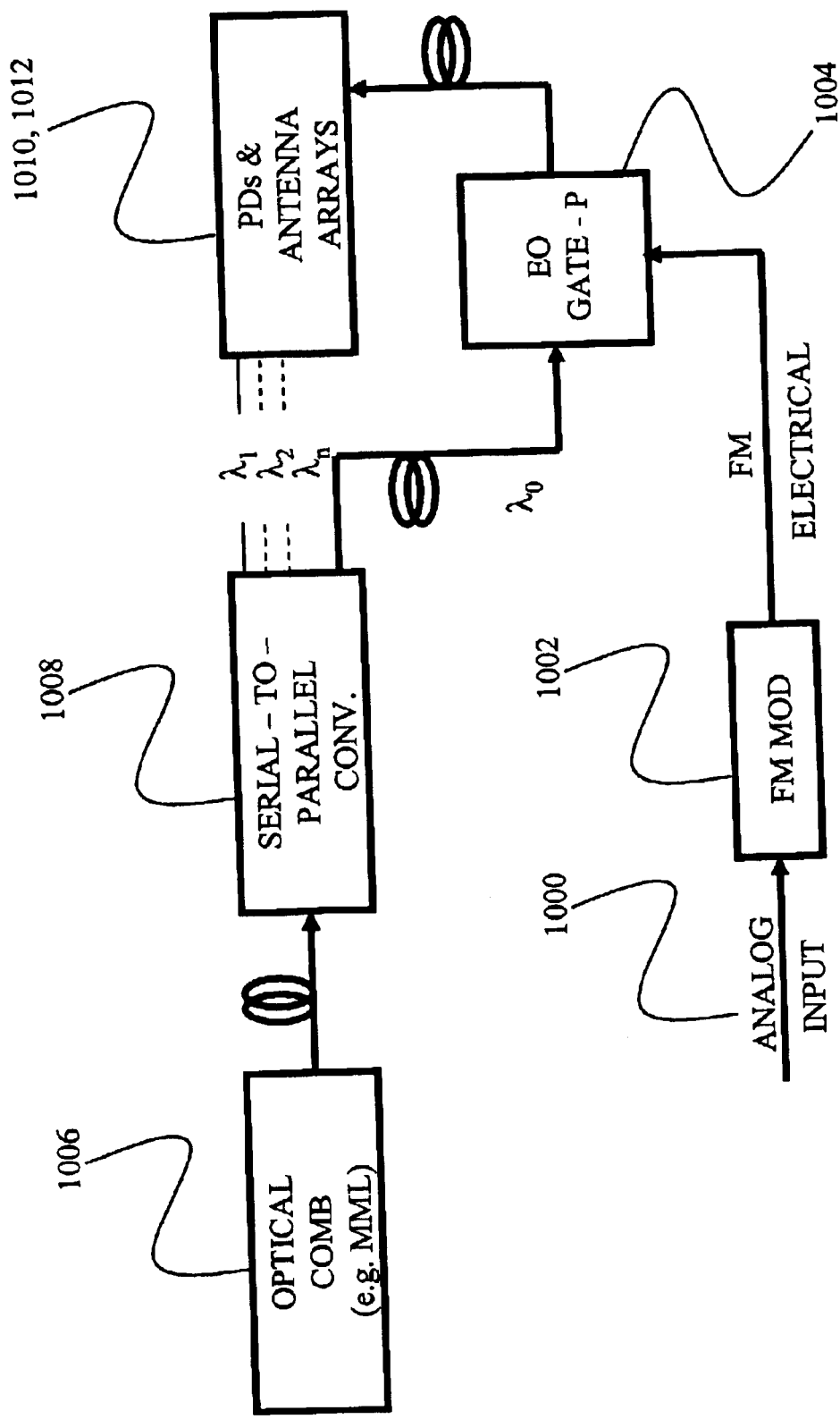
FIG. 10 is a block diagram of HIR components configured for analog modulation by frequency modulation.

In this scheme, the beating wavelength $\lambda_0$ is passed through a phase modulator driven by an FM electrical signal, as shown in FIG. 10. In this case, input data from a data source 1000 is first provided to an FM modulator 1002 to provide an FM modulated driving signal. The FM modulated driving signal is then used to drive an electro-optical gate (modulator) 1004 to impose the FM modulation onto an optical component. In the diagram, the component is depicted as one of the parallel optical components resulting from generation by an optical comb generator 1006 and after serial-to-parallel conversion by a serial-to-parallel converter 1008. Subsequently, the modulated component and the other components are passed to photodetectors 1010 and antennas 1012 for launching into free-space.

(c) Other Aspects

As mentioned, the modulation schemes herein may be applied in both single-tone and in pulse stream forms. In addition, the operations of the modulation schemes may also be viewed as steps in methods for modulating single-tones and pulse streams for UWB radio systems.

What is claimed is:

1. An opto-electronic modulation apparatus for an ultra-wide band (UWB) radio system, the opto-electronic modulation apparatus comprising an optical modulator block for receiving a UWB harmonic impulse signal and for modulating the UWB harmonic impulse signal based on data received through an input to the modulator block in order to generate a modulated UWB signal for launching by a UWB transmitting block.

2. An opto-electronic modulation apparatus for an ultra-wide band (UWB) radio system, as set forth in claim 1, wherein the opto-electronic modulation apparatus is configured to receive a UWB harmonic impulse signal in a form of a pulse stream of components, and to modulate each of the pulse stream components, except a beating component, based on data received through the input to the modulator block.

3. An opto-electronic modulation apparatus for an ultra-wide band (UWB) radio system, as set forth in claim 2, wherein the optical modulator block is a digital optical modulator.

4. An opto-electronic modulation apparatus for an ultra-wide band (UWB) radio system, as set forth in claim 3, wherein the modulator block comprises an electro-optical intensity modulator.

5. An opto-electronic modulation apparatus for a UWB radio system as set forth in claim 4, wherein the modulator block is selected from a group consisting of electro-absorption modulators and LiNbO3 modulators and provides for on/off keying.

6. An opto-electronic modulation apparatus for a UWB radio system as set forth in claim 4, wherein the modulation block has a modulation rate, and wherein the modulation rate is variable.

7. An opto-electronic modulation apparatus for a UWB radio system as set forth in claim 6, wherein opto-electronic modulation apparatus further comprises a means for adjusting a pulse repetition frequency of an optical comb generator that supplies the pulse stream to the opto-electronic modulation apparatus.

8. An opto-electronic modulation apparatus for a UWB radio system as set forth in claim 6, wherein the modulation rate is variable by means of harmonic selection.

9. An opto-electronic modulation apparatus for a UWB radio system as set forth in claim 6, wherein the opto-electronic modulation apparatus further comprises a voltage-controlled oscillator connected with the modulator block and with an optical comb generator that supplies the pulse stream to the opto-electronic modulation apparatus to allow for a continuous modulation rate change around a comb fundamental frequency.

10. An opto-electronic modulation apparatus for a UWB radio system as set forth in claim 3, wherein the modulator block comprises an electro-optical phase modulator configured to impose a polarity modulation scheme onto the UWB harmonic impulse signal based on the data input.

11. An opto-electronic modulation apparatus for a UWB radio system as set forth in claim 10, wherein the electro-optical phase modulator modulates the pulse stream components using a 180 degree phase shift to provide a bipolar phase shift-keying modulation scheme.

12. An opto-electronic modulation apparatus for an ultra-wide band (UWB) radio system, as set forth in claim 1, wherein the opto-electronic modulation apparatus is configured to receive a single reference tone from a UWB harmonic impulse signal comprised of component tones, and to modulate a single reference tone of the component tones based on data received through the input to the modulator block to generate a beating note for beating with other component tones of the UWB harmonic impulse signal for generating difference notes for launching by the UWB transmitting block.

13. An opto-electronic modulation apparatus for an ultra-wide band (UWB) radio system, as set forth in claim 12, wherein the modulator block is a digital optical modulator.

14. An opto-electronic modulation apparatus for an ultra-wide band (UWB) radio system, as set forth in claim 13, wherein the modulator block comprises an electro-optical intensity modulator that modulates the single reference tone by on/off keying.

15. An opto-electronic modulation apparatus for a UWB radio system as act forth in claim 13, wherein the modulation block comprises an electro-optical phase modulator configured to impose a polarity modulation scheme onto the single reference tone based on the data input.

16. An opto-electronic modulation apparatus for a UWB radio system as set forth in claim 15, wherein the electro-optical phase modulator modulates the single reference tone using a 180 degree phase shift to provide a bipolar phase shift-keying modulation scheme.

17. An opto-electronic modulation apparatus for a UWB radio system as set forth in claim 12, wherein the means for opto-electronically modulating a signal is an analog optical modulator.

18. An opto-electronic modulation apparatus for a UWB radio system as set forth in claim 17, wherein the optical modulator block comprises:

an acousto-optic modulator for receiving analog data and for providing an output signal based on the received analog data;

a tapered waveguide Fiber Bragg Grating (FBG) having a reflective length, the tapered waveguide FBG connected with the acousto-optic modulator and responsive to the output of the acousto-optic modulator such that the reflective length of the tapered waveguide FBG varies in response to signals from the acousto-optic modulator;

a circulator connected to receive the single reference tone and to pass the single reference tone to the tapered waveguide FBG to be modulated thereby according to changes in the reflective length, and then to a UWB transmitting block as a beating note; whereby an analog pulse-position modulated scheme is used to generate a modulated UWB signal for launching by the UWB transmitting block.

19. An opto-electronic modulation apparatus for a UWB radio system as set forth in claim 17, wherein the opto-electronic modulation apparatus further comprises an FM modulator for receiving and FM-modulating analog data, and for providing the modulated analog data to the modulator block through the input; whereby the FM modulator is used to drive the modulator block to cause the modulator block to impose FM-modulated data onto the single reference tone.

20. A means for opto-electronically modulating a signal for a UWB radio system, the means for opto-electronically modulating a signal comprising a means for receiving a UWB harmonic impulse signal and for modulating the UWB harmonic impulse signal based on data in order to generate a modulated UWB signal for launching by a UWB transmitting block.

21. A means for opto-electronically modulating a signal for a UWB radio system as set forth in claim 20, wherein the means for opto-electronically modulating a signal is configured to receive a UWB harmonic impulse signal in a form of a pulse stream of components, and to modulate each of the pulse stream components, except a beating component, based on data received through an input to the means for modulating the UWB harmonic impulse signal.

22. A means for opto-electronically modulating a signal for a UWB radio system as set forth in claim 21, wherein the means for opto-electronically modulating a signal is a digital optical modulator.

23. A means for opto-electronically modulating a signal for a UWB radio system as set forth in claim 22, wherein the means for opto-electronically modulating a signal comprises an electro-optical intensity modulator.

24. A means for opto-electronically modulating a signal for a UWB radio system as set forth in claim 23, wherein the means for opto-electronically modulating a signal is selected from a group consisting of electro-absorption modulators and LiNbO3 modulators and provides for on/off keying.

25. A means for opto-electronically modulating a signal for a UWB radio system as set forth in claim 23, wherein the means for opto-electronically modulating a signal has a modulation rate, and wherein the modulation rate is variable.

26. A means for opto-electronically modulating a signal for a UWB radio system as set forth in claim 25, wherein means for opto-electronically modulating a signal further comprises a means for adjusting a pulse repetition frequency of an optical comb generator that supplies the pulse stream to the means for opto-electronically modulating a signal.

27. A means for opto-electronically modulating a signal for a UWB radio system as set forth in claim 25, wherein the modulation rate is variable by means of harmonic selection.

28. A means for opto-electronically modulating a signal for a UWB radio system for a UWB radio system as set forth in claim 25, wherein the means for opto-electronically modulating a signal further comprises a voltage-controlled oscillator connected therewith, and with an optical comb generator that supplies the pulse stream thereto to allow for a continuous modulation rate change around a comb fundamental frequency.

29. A means for opto-electronically modulating a signal for a UWB radio system as set forth in claim 22, wherein the means for opto-electronically modulating a signal comprises an electro-optical phase modulator configured to impose a polarity modulation scheme onto the UWB harmonic impulse signal based on the data input.

30. A means for opto-electronically modulating a signal for a UWB radio system as set forth in claim 29, wherein the electro-optical phase modulator modulates the pulse stream components using a 180 degree phase shift to provide a bipolar phase shift-keying modulation scheme.

31. A means for opto-electronically modulating a signal for a UWB radio system as set forth in claim 20, wherein the means for opto-electronically modulating a signal is configured to receive a single reference tone from a UWB harmonic impulse signal comprised of component tones, and to modulate a single reference tone of the component tones based on data to generate a beating note for beating with other component tones of the UWB harmonic impulse signal for generating difference notes for launching by the UWB transmitting block.

32. A means for opto-electronically modulating a signal for a UWB radio system as set forth in claim 31, wherein the means for opto-electronically modulating a signal is a digital optical modulator.

33. A means for opto-electronically modulating a signal for a UWB radio system as set forth in claim 32, wherein the means for opto-electronically modulating a signal comprises an electro-optical intensity modulator that modulates the single reference tone by on/off keying.

34. A means for opto-electronically modulating a signal for a UWB radio system as set forth in claim 32, wherein the means for opto-electronically modulating a signal comprises an electro-optical phase modulator configured to impose a polarity modulation scheme onto the single reference tone based on the data input.

35. A means for opto-electronically modulating a signal for a UWB radio system as set forth in claim 34, wherein the electro-optical phase modulator modulates the single reference tone using a 180 degree phase shift to provide a bipolar phase shift-keying modulation scheme.

36. A means for opto-electronically modulating a signal for a UWB radio system as set forth in claim 31, wherein the means for opto-electronically modulating a signal is an analog optical modulator.

37. A means for opto-electronically modulating a signal for a UWB radio system as set forth in claim 36, wherein the means for opto-electronically modulating a signal comprises:

an acousto-optic modulator for receiving analog data and for providing an output signal based on the received analog data;

a tapered waveguide Fiber Bragg Grating (FBG) having a reflective length, the tapered waveguide FBG connected with the acousto-optic modulator and responsive to the output of the acousto-optic modulator such that the reflective length of the tapered waveguide FBG varies in response to signals from the acousto-optic modulator, a circulator connected to receive the single reference tone and to pass the single reference tone to the tapered waveguide FBG to be modulated thereby according to changes in the reflective length, and then to a UWB transmitting block as a beating note; whereby an analog pulse-position modulated scheme is used to generate a modulated UWB signal for launching by the UWB transmitting block.

38. A means for opto-electronically modulating a signal for a UWB radio system as set forth in claim 36, wherein the means for opto-electronically modulating a signal further comprises an FM modulator for receiving and FM-modulating analog data, and for using the FM modulator to drive the means for opto-electrically modulating a signal to cause the means for opto-electronically modulating a signal to impose FM-modulated data onto the single reference tone.

39. A method for opto-electronically modulating a signal for a UWB radio system comprising steps of:

receiving a UWB harmonic impulse signal and modulating the UWB harmonic impulse signal based on data in order to generate a modulated UWB signal for launching by a UWB transmitting blocks.

40. A method for opto-electronically modulating a signal for a UWB radio system as set forth in claim 39, wherein in the receiving step, the received UWB harmonic impulse signal is in a form of a pulse stream of components, and wherein in the modulating step, each of the pulse stream components is modulated, except a beating component, based on received data.

41. A method for opto-electronically modulating a signal for a UWB radio system as set forth in claim 40, wherein the steps are performed by a digital optical modulator.

42. A method for opto-electronically modulating a signal for a UWB radio system as set forth in claim 41, wherein the steps are performed by an electro-optical intensity modulator.

43. A method for opto-electronically modulating a signal for a UWB radio system as set forth in claim 42, wherein the steps are performed by a modulator selected from a group consisting of electro-absorption modulators and LiNbO3 modulators and provide for on/off keying.

44. A method for opto-electronically modulating a signal for a UWB radio system as set forth in claim 42, wherein the step of modulating is performed with a modulation rate, and wherein the modulation rate is variable.

45. A method for opto-electronically modulating a signal for a UWB radio system as set forth in claim 44, wherein the method further comprises a step of adjusting a pulse repetition frequency of an optical comb generator that supplies the pulse stream for modulation.

46. A method for opto-electronically modulating a signal for a UWB radio system as set forth in claim 44, wherein the modulation rate is variable by means of harmonic selection.

47. A method for opto-electronically modulating a signal for a UWB radio system as set forth in claim 44, wherein the method further comprises a step of continuously changing a modulation rate around a comb fundamental frequency by means of a voltage-controlled oscillator.

48. A method for opto-electronically modulating a signal for a UWB radio system as set forth in claim 41, wherein the steps are performed by an electro-optical phase modulator configured to impose a polarity modulation scheme onto the UWB harmonic impulse signal based on the data input.

49. A method for opto-electronically modulating a signal for a UWB radio system as sat forth in claim 48, wherein the electro-optical phase modulator modulates the pulse stream components using a 180 degree phase shift to provide a bipolar phase shift-keying modulation scheme.

50. A method for opto-electronically modulating a signal for a UWB radio system as set forth in claim 39, wherein in the receiving step, a single reference tone from a UWB harmonic impulse signal comprised of component tones is received, wherein in the modulating step, a single reference tone of the component tones is modulated based on data to generate a beating note for beating with other component tones of the UWB harmonic impulse signal for generating difference notes for launching by the UWB transmitting block.

51. A method for opto-electronically modulating a signal for a UWB radio system as set forth in claim 50, wherein the steps arc performed by a digital optical modulator.

52. A method for opto-electronically modulating a signal for a UWB radio system as set forth in claim 51, wherein the steps are performed by an electro-optical intensity modulator that modulates the single reference tone by On/off keying.

53. A method for opto-electronically modulating a signal for a UWB radio system as set forth in claim 51, wherein the steps are performed by an electro-optical phase modulator configured to impose a polarity modulation scheme onto the single reference tone based on the data input.

54. A method for opto-electronically modulating a signal for a UWB radio system as set forth in claim 53, wherein the electro-optical phase modulator modulates the single reference tone using a 180 degree phase shift to provide a bipolar phase shift-keying modulation scheme.

55. A method for opto-electronically modulating a signal for a UWB radio system as set forth in claim 50, wherein the steps are performed by an analog optical modulator.

56. A method for opto-electronically modulating a signal for a UWB radio system as set forth in claim 55, further comprising steps of:

receiving analog data in an acousto-optic modulator and providing an output signal based on the received analog data;

varying a reflective length of a tapered waveguide Fiber Bragg Grating (FBG) connected with the acousto-optic modulator and responsive to the output of the acousto-optic modulator such that the reflective length of the tapered waveguide FBG varies in response to signals from the acousto-optic modulator, applying a circulator connected to receive the single reference tone and to pass the single reference tone to the tapered waveguide FBG to be modulated thereby according to changes in the reflective length, and then to a UWB transmitting block as a beating note; whereby an analog pulse-position modulation scheme is used to generate a modulated UWB signal for launching by the UWB transmitting block.

57. A method for opto-electronically modulating a signal for a UWB radio system as set forth in claim 55, further comprising a step of FM-modulating analog data, and of using the FM modulator to drive the step of modulating a signal to impose FM-modulated data onto the single reference tone.

* * * * *